(12) United States Patent
Georgiev

(10) Patent No.: US 7,956,924 B2
(45) Date of Patent: Jun. 7, 2011

(54) FAST COMPUTATIONAL CAMERA BASED ON TWO ARRAYS OF LENSES

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 574 days.

(21) Appl. No.: 11/874,611

(22) Filed: Oct. 18, 2007

(65) Prior Publication Data

US 2009/0102956 A1 Apr. 23, 2009

(51) Int. Cl.
*H04N 5/225* (2006.01)

(52) U.S. Cl. ........ 348/340; 348/315; 348/335; 348/343; 348/344

(58) Field of Classification Search .................. None
See application file for complete search history.

(56) References Cited

U.S. PATENT DOCUMENTS

| | | | |
|---|---|---|---|
| 725,567 A | 4/1903 | Ives | |
| 2,039,648 A | 5/1936 | Ives | |
| 3,985,419 A | 10/1976 | Matsumoto et al. | |
| 4,180,313 A | 12/1979 | Inuiya | |
| 4,193,093 A | 3/1980 | St. Clair | |
| 4,849,782 A | 7/1989 | Koyama et al. | |
| 5,076,687 A | 12/1991 | Adelson | |
| 5,361,127 A | 11/1994 | Daily | |
| 5,400,093 A | 3/1995 | Timmers | |
| 5,659,420 A | 8/1997 | Wakai et al. | |
| 5,729,011 A | 3/1998 | Sekiguchi | |
| 5,946,077 A | 8/1999 | Nemirovskiy | |
| 6,097,541 A | 8/2000 | Davies et al. | |
| 6,137,937 A | 10/2000 | Okano et al. | |
| 6,268,846 B1 | 7/2001 | Georgiev | |
| 6,301,416 B1 | 10/2001 | Okano et al. | |

(Continued)

FOREIGN PATENT DOCUMENTS

EP 1548481 6/2005

(Continued)

OTHER PUBLICATIONS

J. Neumann, et al., "Eyes from Eyes Analysis of Camera Design Using Plenoptic Video Geometry," Dec. 2001, XP002509893.

(Continued)

*Primary Examiner* — Jason Chan
*Assistant Examiner* — Yih-Sien Kao
(74) *Attorney, Agent, or Firm* — Robert C. Kowert; Meyertons, Hood, Kivlin, Kowert & Goetzel, P.C.

(57) ABSTRACT

Method and apparatus for a fast (low F/number) computational camera that incorporates two arrays of lenses. The arrays include a lenslet array in front of a photosensor and an objective lens array of two or more lenses. Each lens in the objective lens array captures light from a subject. Each lenslet in the lenslet array captures light from each objective lens and separates the captured light to project microimages corresponding to the objective lenses on a region of the photosensor under the lenslet. Thus, a plurality of microimages are projected onto and captured by the photosensor. The captured microimages may be processed in accordance with the geometry of the objective lenses to align the microimages to generate a final image. One or more other algorithms may be applied to the image data in accordance with radiance information captured by the camera, such as automatic refocusing of an out-of-focus image.

25 Claims, 12 Drawing Sheets

U.S. PATENT DOCUMENTS

| | | | |
|---|---|---|---|
| 6,339,506 | B1 | 1/2002 | Wakelin et al. |
| 6,351,269 | B1 | 2/2002 | Georgiev |
| 6,476,805 | B1 | 11/2002 | Shum et al. |
| 6,738,533 | B1 | 5/2004 | Shum et al. |
| 6,838,650 | B1 | 1/2005 | Toh |
| 7,054,067 | B2 | 5/2006 | Okano et al. |
| 7,620,309 | B2 | 11/2009 | Georgiev |
| 7,732,744 | B2 | 6/2010 | Utagawa |
| 2001/0012149 | A1 | 8/2001 | Lin et al. |
| 2001/0050813 | A1 | 12/2001 | Allio |
| 2002/0140835 | A1* | 10/2002 | Silverstein .................... 348/340 |
| 2003/0231255 | A1 | 12/2003 | Szajewski et al. |
| 2004/0114807 | A1 | 6/2004 | Lelescu et al. |
| 2004/0223214 | A1 | 11/2004 | Atkinson |
| 2005/0088714 | A1 | 4/2005 | Kremen |
| 2008/0152215 | A1 | 6/2008 | Horie et al. |
| 2008/0165270 | A1 | 7/2008 | Watanabe et al. |
| 2008/0193026 | A1 | 8/2008 | Horie et al. |
| 2009/0041381 | A1 | 2/2009 | Georgiev |
| 2009/0041448 | A1 | 2/2009 | Georgiev |
| 2009/0140131 | A1 | 6/2009 | Utagawa |
| 2010/0026852 | A1 | 2/2010 | Ng et al. |

FOREIGN PATENT DOCUMENTS

| | | |
|---|---|---|
| WO | 0137025 | 5/2001 |
| WO | 2006/057838 | 6/2006 |
| WO | 2007/115281 | 10/2007 |

OTHER PUBLICATIONS

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002.
Ren NG, et al., "Light Field Photography with a Hand-Held Plenoptic Camera," retrieved from Internet Mar. 6, 2007, XP002423384.
Yang, J C, et al., "A Real-Time Distributed Light Field Camera," Rendering Techniques 2002, Eurographics Workshop Proceedings, PIS, Italy, Jun. 26-28, 2002.
International Search Report and Written Opinion from PCT/US2008/080238, mailed Jan. 23, 2009.
T. Adelson and J. Bergen, "The plenoptic function and the elements of early vision," From M. Landy and J. A. Movshon (eds), Computational Models of Visual Processing (pp. 3-20). Cambridge, MA: MIT Press (1991), 18 pages.
Tanida, J. Yamada, K., "TOMBO: thin observation module by bound optics," Lasers and Electro-Optics Society, 2002. LEOS 2002. The 15th Annual Meeting of the IEEE, Issue Date: 2002, pp. 233-234 vol. 1.
M Christensen, M Haney, D Rajan, S Douglas, and S Wood, "Panoptes: A thin agile multi-resolution imaging sensor," Government Microcuircuit Applications and Critical, Technology Conference (GOMACTech-05)(Jan. 2005), 4 pages.
D Capel and A Zisserman, "Computer vision applied to super resolution," Signal Processing Magazine(Jan. 2003), 10 pages.
P Sloan, M Cohen, and S Gortler, "Time critical lumigraph rendering," Proceedings of the 1997 symposium on Interactive 3D graphics (Jan. 1997), 7 pages.
S Todt, C Rezk-Salama, A Kolb, and K.-D Kuhnert, "Fast (Spherical) Light Field Rendering with Per-Pixel Depth," Technical Report, Computer Graphics Group, University of Siegen, 2007, 8 pages.
John Nickolls, Ian Buck, Michael Garland, and Kevin Skadron, "Scalable parallel programming with cuda," Queue 6, 40-53 (2008), 40 pages.
John E. Stone, David Gohara, and Guochun Shi, "OpenCL—The open standard for parallel programming of heterogeneous systems." Comput. in Sci. and Eng., 12:66-73, 2010, 66 pages.
"PyOpenGL, The Python OpenGL® Binding" downloaded from http://pyopengl.sourceforge.net/ on Dec. 21, 2010, 2 pages.
Mark Segal, Kurt Akeley. The OpenGL Graphics System: A Specification (Version 3.2 (Core Profile)—Dec. 7, 2009), 104 pages.
John Kessenich, Dave Baldwin, Randi Rost. The OpenGL Shading Language, Version: 4.00, Document Revision: 7, Feb. 12, 2010, 160 pages.
Georgiev T., Lumsdaine A.: Depth of field in plenoptic cameras. In Eurographics 2009—Annex (Apr. 2009), pp. 5-8.
Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I:436-443, 2004.
Georgeiv, et al. "Spatio-Angular Resolution Tradeoff in Integral Photography," Proc. EGSR, 2006, 10 pages.
Levoy, Mark et al., "Light Field Microscopy," Stanford University, Submitted to Siggraph 2006, 5 pages.
Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I:436-443, 2004.
Levoy, Mark, "Optical Recipes for Light Microscopes," Stanford Computer Grpahics Laboratory Technical Memo 2006-001, Jun. 20, 2006, 10 pages.
Adelson T., Wang J.: "Single Lens Stereo with a Plenoptic Camera," IEEE Transactions on Pattern Analysis and Machine Intelligence (1992), 99-106.
Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.
Gortler S. J., Grzeszczuk R., Szeliski, R., Cohen M. F.: "The Lumigraph," ACM Trans. Graph. (1996), 43-54.
Georgiev T., Wainer M.: "Morphing Between Multiple Images," Tech. Rep. (1997).
Isaksen A., McMillan L., Gortler S. J.: "Dynamically Reparameterized Light Fields," ACM Trans. Graph. (2000), 297-306.
Xiao J., Shah M.: "Tri-view Morphing," Computer Vision and Image Understanding 96, 3 (2004), 345-366.
Lippmann G.: "Epreuves reversible donnant la sensation du relief ("Reversible Prints Providing the Sensation of Depth")", Journal of Physics 7 (1908), pp. 821-825.
Lippmann G.: "Epreuves Reversibles Photographies Integrales," Academie des sciences (Mar. 1908), pp. 446-451.
Lee S., Wolberg G., Shin S.: "Polymorph: Morphing Among Multiple Images," IEEE Computer Graphics and Applications (1998).
Park, S., Park, M., and Kang, M., "Super-resolution image reconstruction: a technical overview," Signal Processing Magazine, 2003, 16 pages.
NG R.: "Fourier Slice Photography," Proceedings of ACM SIGGRAPH 2005 (Jan. 2005).
Naemura T., Yoshida T., Harashima H.: "3d Computer Graphics Based on Integral Photography," Optics Express, vol. 8, 2 (2001).
Zitnick C. L., Jojic N., Kang S.: "Consistent Segmentation for Optical Flow Estimation" In Proceedings of IEEE International Conference on Computer Vision (ICCV) (2005).
Seitz S. M., Dyer C. R.: "View Morphing," ACM Trans. Graph. (1996), 21-30.
Stevens R., Harvey T.: "Lens Arrays for a Three-dimensional Imaging System," Journal of Optics A, vol. 4 (2002).
Stewart J., Yu J., Gortler S. J., McMillan L.: "A New Reconstruction Filter for Undersampled Light Field," Eurographics Symposium on Rendering (2003), 150-156.
Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).
Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005).
U.S. Appl. No. 12/574,183, filed Oct. 6, 2009.
U.S. Appl. No. 12/144,411, filed Jun. 23, 2008.
U.S. Appl. No. 12/186,396, filed Jun. 23, 2008.
U.S. Appl. No. 11/627,141, filed Jan. 25, 2007.
David E. Roberts, History of Lenticular and Related Autostereoscopic Methods, 2003, 17 pages.
Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.
Lumsdaine A., Georgiev T.: Full Resolution Lightfield Rendering. Tech. rep., Adobe Systems, Jan. 2008, 12 pages.

Baker S., Kanade T.: Limits on superresolution and how to break them. IEEE Transactions on Pattern Analysis and Machine Intelligence (Jan. 2002), 377 pages.

Bishop T. E., Zanetti S., Favaro P.: Light field superresolution. In International Conference on Computational Photography (Apr. 16-17, 2009), 4 pages.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Lin Z., Shum H.: Fundamental limits of reconstruction-based super-resolution algorithms under local translation. IEEE Transactions on Pattern Analysis and Machine Intelligence 26, (Jan. 1, 2004), 83-97.

NG M. K., Bose N. K.: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Lumsdaine A., Georgiev T.: The focused plenoptic camera. In International Conference on Computational Photography (Apr. 2009), 8 pages.

Levoy, et al. "Recording and controlling the 4D light field in a microscope using microlens arrays", Journal of Microscopy, 2009, 19 pages.

Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, 12 pages, XP002491494.

M. Levoy, "Light Fields and computational Imaging," Computer [Online], vol. 39, No. 8, Aug. 2006, pp. 46-55, XP002501300.

Levoy M., Hanrahan P.: "Light Field Rendering," ACM Trans. Graph. (1996), 31-42.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

Todor Georgiev and Chintan Intwala: "Light Field Camera Design for Integral View Photography," Adobe Tech. Rep., 2006, 13 pages.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for video technology, IEEE Service Center, vol. 13, No. 11, Nov. 1, 2003, 18 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Ulrich, Fecker, et al., "Transported Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Chang, et al., "Light Field Compression Using Disparity-Compensated Lifting and Shape Adaptation," IEEE Transactions on Image Processing, vol. 15, No. 4, Apr. 2006, pp. 793-806.

Sebe, et al., "Multi-View Geometry Estimation for Light Field Compression," VMV 2002, 8 pages.

Borman, S., and Stevenson, R., "Super-resolution from image sequences—a review", Proceedings of the 1998 Midwest Symposium on Circuits and Systems, Publication Date: Aug. 9-12, 1998, On pp. 374-378.

Elad, M., and Feuer, A., "Restoration of a single suppersolution image from several blurred, noisy, and undersampled measured images," IEEE Transactions on Image Processing Dec. 1997, pp. 1646-1658.

Farsiu, S., Robinson, D., Elad, M., and Milanfar, P., "Advances and challenges in super-resolution," International Journal of Imaging Systems and Technology, 2004, 12 pages.

\* cited by examiner

FAST COMPUTATIONAL CAMERA BASED ON TWO ARRAYS OF LENSES

BACKGROUND

1. Field of the Invention

This invention relates to cameras, and more specifically to digital cameras and light-field cameras.

2. Description of the Related Art

FIG. 1 illustrates an exemplary conventional digital camera that employs a single objective lens 104 and a photosensor 108. A camera lens 104 is considered "fast" if the lens collects lots of light, thus making fast shutter speed possible. The F/number of a lens is a measure of how much light can be collected by the lens, where:

$$F/\text{number} = (\text{focal length})/(\text{aperture diameter})$$

Quality fast objective lenses are desirable because they make photography in low lighting conditions possible, and also action photography possible. Fast general-purpose lenses are lenses with an F/number of F/1.8 or less. Telephoto lenses, for example for use in sports and wildlife photography, are considered fast even at F/2.8 because they are much harder to build at lower F/numbers. Even point-and-shoot cameras need relatively fast lenses if they are to be used in low light conditions in places where flash is inappropriate. However, quality fast lenses are hard to design and to build, and thus tend to be expensive. There are optical solutions to the problem of building fast lenses. However, those solutions get very expensive at low F/numbers due to the large angle of refraction far from optical axis at low F/numbers, which means correction for aberrations becomes difficult. Multiple high precision lens elements are needed. Also, those lens elements are bulky, making high-quality fast lenses big and heavy. The fact that high-quality objective lenses are typically actually a series of two or more individual lenses in series to provide correction for aberrations in individual lenses adds to both the bulk and the expense of the objective lenses.

Another approach is to increase photon efficiency of the photosensor (e.g., a charge-coupled device (CCD)). However, the industry has already reached near-optimal efficiency at acceptable prices. Also, at current efficiencies of 50% or more, achieving significant improvements is difficult. Even in theory efficiency of photosensors cannot improve more than two times better, as efficiency above 100% obviously cannot be reached.

Light-Field Cameras

Conventional cameras, as illustrated in FIG. 1, fail to capture a large amount of optical information. In particular, a conventional camera does not capture information about the location on the aperture where different light rays enter the camera. During operation, a conventional digital camera captures a two-dimensional (2D) image representing a total amount of light that strikes each point on a photosensor 108 within the camera. However, this 2D image contains no information about the directional distribution of the light that strikes the photosensor 108. Directional information at the pixels corresponds to locational information at the aperture.

In contrast, light-field cameras sample the four-dimensional (4D) optical phase space or light-field and in doing so capture information about the directional distribution of the light rays. This information captured by light-field cameras may be referred to as the light-field, the plenoptic function, or radiance. Radiance describes both spatial and angular information, and is defined as density of energy per unit of area per unit of stereo angle (in radians). A light-field camera captures radiance; therefore, images originally taken out-of-focus may be refocused, noise may be reduced, viewpoints may be changed, and other light-field effects may be achieved. Light-field cameras have been designed based on modifications to conventional digital cameras.

FIG. 2 illustrates an exemplary prior art light-field camera, or camera array, which employs an array of two or more objective lenses 110. Each objective lens focuses on a particular region of photosensor 108, or alternatively on a separate photosensor 108. This light-field camera may be viewed as a combination of two or more conventional cameras that each simultaneously records an image of subject 102 on a particular region of photosensor 108 or alternatively on a particular photosensor 108. The captured images may then be combined to form one image.

FIG. 3 illustrates an exemplary prior art plenoptic camera, another type of light-field camera, that employs a single objective lens and a microlens or lenslet array 106 that includes, for example, about 100,000 lenslets that is placed a small distance (~0.5 mm) from a photosensor 108, e.g. a charge-coupled device (CCD). The raw image captured with a plenoptic camera 100 is made up of an array of small images, typically circular, of the main camera lens 108. These small images may be referred to as microimages. The lenslet array 106 enables the plenoptic camera 100 to capture the light-field, i.e. to record not only image intensity, but also the distribution of intensity in different directions at each point. Each lenslet splits a beam coming to it from the main lens 104 into rays coming from different "pinhole" locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 100 generates a microimage at each macropixel. The plenoptic photograph captured by a camera 100 with, for example, 100,000 lenslets will contain 100,000 macropixels, and thus generate 100,000 microimages of subject 102. By appropriately selecting a pixel from each macropixel, a conventional picture of subject 102 may be created from the microimages of subject 102 captured at the macropixels. Moreover, by mixing such images appropriately, images originally taken out-of-focus may be refocused, noise may be reduced, and other light-field effects may be achieved.

SUMMARY

Various embodiments of a method and apparatus for a computational camera that incorporates two arrays of lenses are described. The two lens arrays include a lenslet array in front of the photosensor, and a second array of two or more separate lenses or microlenses that perform as the objective lens. The lens array that replaces the conventional camera objective lens is much thinner and lighter when compared to conventional camera objective lenses, and in addition may be produced and provided at less expense than conventional fast objective lenses while producing, via post-processing of the raw captured image information, final images that are similar to or better in quality to those produced by fast, expensive conventional objective lenses. The final image that is produced after appropriate processing of raw image data captured with embodiments of the computational camera may, for example, be equivalent to an image captured with a lens with an F/number of F/1 or even lower. Furthermore, embodiments of the computational camera are true light-field cameras that capture the light-field (radiance), recording not only image intensity, but also the distribution of intensity in different directions at each point.

In embodiments of the computational camera, each of N objective lenses in an objective lens array captures light from a subject, where N≧2. Each of M lenslets in a lenslet array captures light from each objective lens, where M≧2. Note that, in practice, M will also be ≧N, typically >N. Each lenslet in the lenslet array separates the captured light to generate N microimages corresponding to the N objective lenses on the region of the photosensor under the lenslet. Thus, there are a total of (N*M) microimages projected onto and captured by the photosensor. The (N*M) microimages may then be processed by an algorithm implemented in hardware, software, or a combination thereof in accordance with the geometry of the objective lenses to align the (N*M) microimages to generate a final image. The algorithm for processing the raw image data may be implemented within the computational camera itself or alternatively in a separate device or computer system to which captured image information may be transferred from the computational camera. In addition to an algorithm for processing the raw image data to produce a final digital image, embodiments may also incorporate one or more algorithms implemented in hardware and/or software that perform various functions on the image data in accordance with radiance information captured by the computational camera, such as automatic refocusing of an out-of-focus image.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
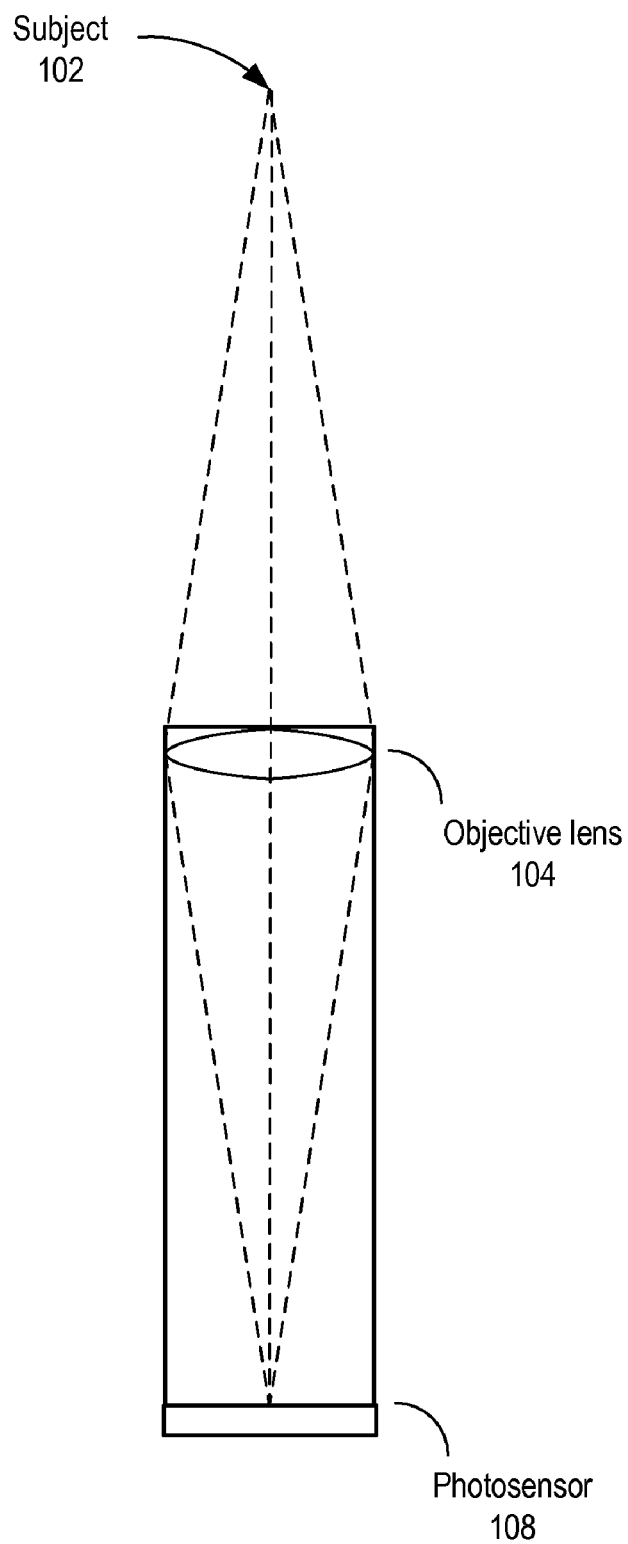
FIG. 1 illustrates an exemplary prior art digital camera that employs a single objective lens and a photosensor.
Figure 2:
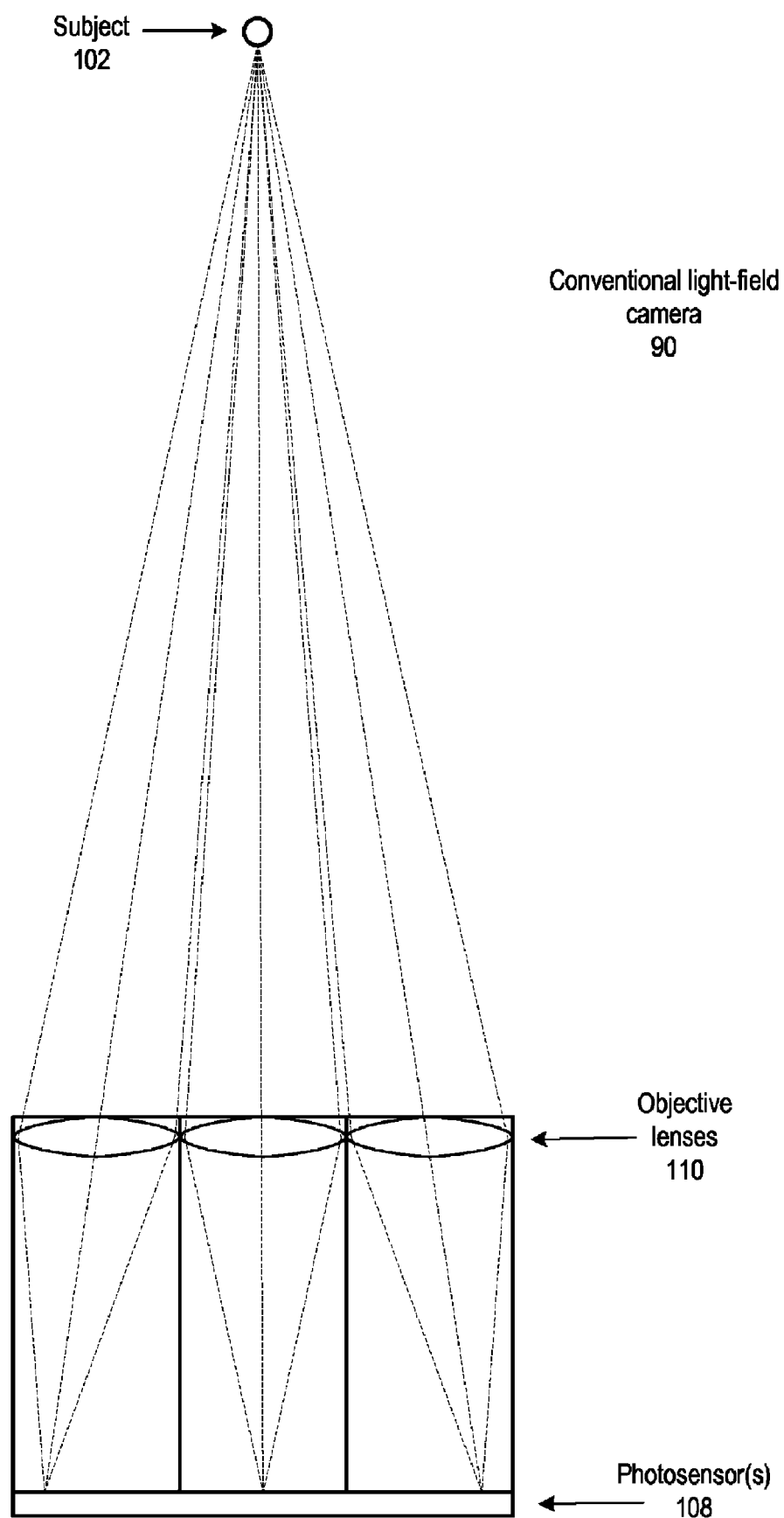
FIG. 2 illustrates an exemplary prior art light-field camera, or camera array, which employs an array of two or more objective lenses.

Various embodiments of a method and apparatus for a computational camera that incorporates two arrays of lenses are described. Embodiments may provide a fast, light, and relatively inexpensive camera, when compared to conventional cameras, that is based on an optical system that incorporates two arrays of lenses. The two lens arrays include a lenslet array in front of a photosensor such as a Charge-Coupled Device (CCD), and a second array of two or more separate lenses or microlenses that perform as the objective lens. The lens array that replaces the conventional camera objective lens is much thinner and lighter when compared to conventional camera objective lenses, particularly fast objective lenses (lenses with low F/numbers), and in addition may be produced and provided at less expense than conventional fast objective lenses while producing, via post-processing of the raw captured image information, final images that are similar to or better in quality to those produced by cameras employing fast, expensive conventional objective lenses. The final image that is produced after appropriate processing of raw image data captured with embodiments of the computational camera may be equivalent to an image captured with an objective lens at F/1 or even lower. Furthermore, embodiments of the computational camera are true light-field cameras that capture the light-field (radiance), recording not only image intensity, but also the distribution of intensity in different directions at each point. However, embodiments of the computational camera may be configured to be faster (have lower F/numbers) and to provide higher resolution than conventional light-field cameras, including conventional plenoptic cameras, such as the exemplary conventional light-field cameras illustrated in FIGS. 2 and 3.

Figure 4:
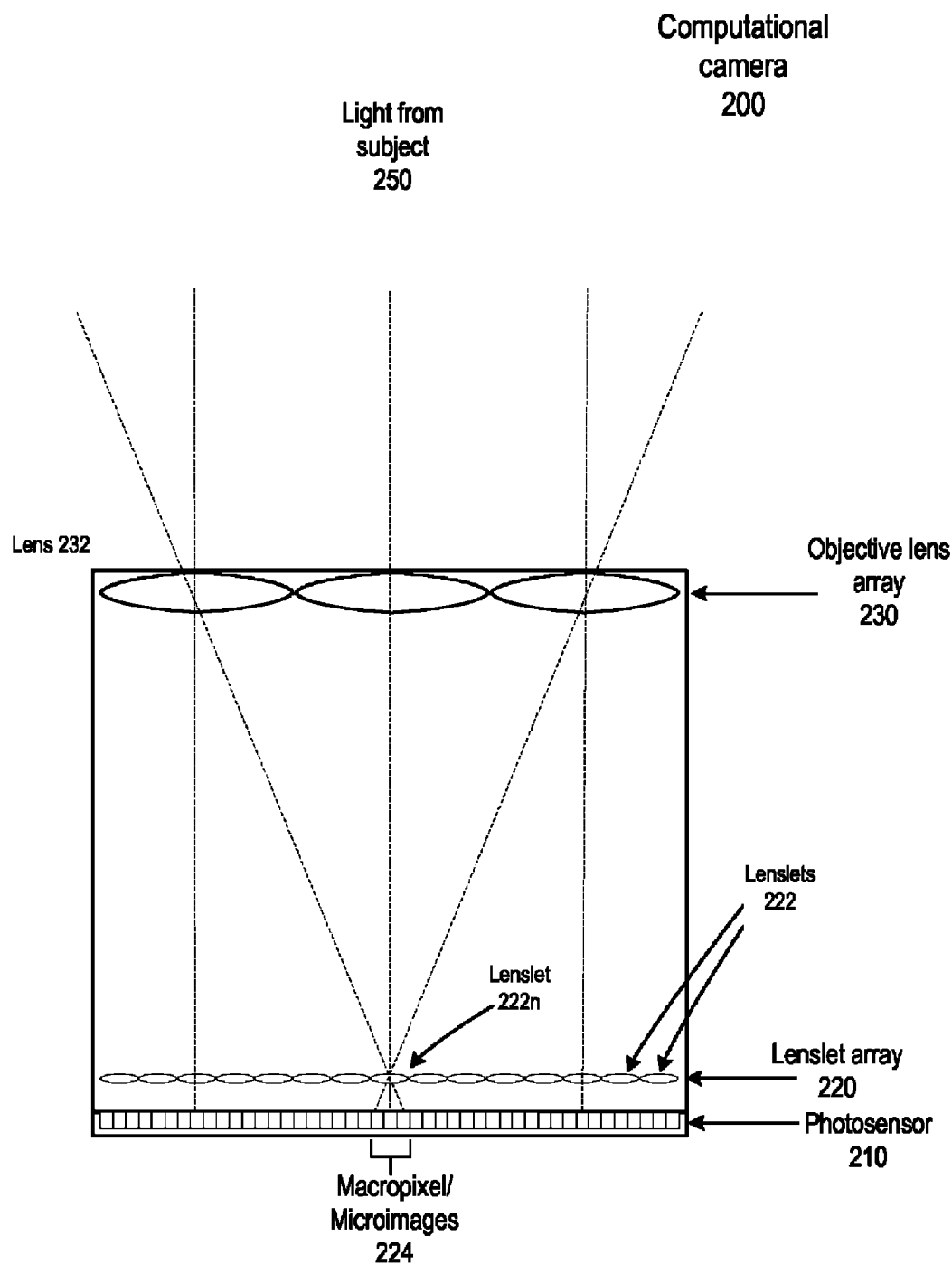
FIG. 4 illustrates an exemplary computational camera including three lenses as objective lenses and a lenslet array according to one embodiment.

A method to make a faster camera is to make the main lens aperture larger in order to capture more light. A method to increase resolution in a digital camera is to use more pixels in the photosensor (e.g., more pixels in a CCD). Both of these objectives may be achieved by using an objective lens array that includes two or more objective lenses and a second array of lenslets between the objective lens array and the photosensor, as is described herein for various embodiments of a computational camera. FIG. 4 illustrates an exemplary computational camera including three lenses as objective lenses in an objective lens array and a lenslet array between the objective lens array and a photosensor, according to one embodiment. The embodiment illustrated in FIG. 4 uses three objective lenses arranged linearly. In this exemplary embodiment, each lenslet 222 in lenslet array 220 have an F/number of 4 (F/4). There are three lenses 232 in the exemplary objective lens array 230, each with an F/number of 20 (F/20). Each lenslet 222 in exemplary lenslet array 220 receives light from each objective lens 232 in objective lens array 230. In this example, lenslet 222n is shown receiving light from subject 250 from each objective lens 232. Lenslet 222n refracts and focuses the light from each objective lens 232 onto one or more pixels in a region, or macropixel, of photosensor 210 under the lenslet 222n. This results in three microimages 224, each corresponding to one of the objective lenses 232, being captured at photosensor 210 in a region or macropixel under lenslet 222n. Thus, the three objective lenses 232 create, under each lenslet 222, three microimages 224. These microimages 224 generally match the shape of the objective lenses 232; for example, these microimages 224 are circular if the objective lenses 232 are circular. The microimages 224 are positioned relative to one another according to the positioning of the objective lenses 232.

Each objective lens 232 creates its own image centered under the lens. Thus, multiple objective lenses 232 create, on lenslet array 220, multiple images that may overlap one another, creating what may be referred to as a "ghosting" artifact. The ghosting artifact may be corrected according to an algorithm implemented in hardware, software, or a combination thereof. The algorithm may correct for the ghosting artifact created by the exemplary computational camera 200 of FIG. 4 by shifting the left and right microimages 224 under each lenslet 222 to the right and left, respectively, in accordance with the geometry of the objective lens array, for example in accordance with the distance between the objective lenses 232.

As described above, lenslets 222 in lenslet array 220 of the exemplary computational camera 200 illustrated in FIG. 4 may have an F/number of F/4. However, while the conventional plenoptic camera 100 illustrated in FIG. 3 has a single main (objective) lens 104 at the same F/number as for the lenslets in lenslet array 106 (e.g., F/4), the computational camera 200 illustrated in FIG. 4 uses three smaller objective lenses 232 each with an F/number of F/20. As a result, the individual microimages 224 of the objective lenses 232 created on photosensor 210 of computational camera 200 are smaller than the single microimage 112 created by plenoptic camera 100 of FIG. 3. However, since the microimages 224 created by computational camera 200 collect all the light that falls on each lenslet 222, the microimages 224 are brighter than microimage 112 created by plenoptic camera 100 since the light is focused on a smaller area. The diameter of the microimage 224 area in computational camera 200 is smaller by a factor that is the ratio of the F/numbers of lenslets 222 and main lenses 232 of the computational camera 200. Thus, for the microimages 224, a very fast camera that operates at the F/number of the lenslets 222 may be effectively created.

Figure 3:
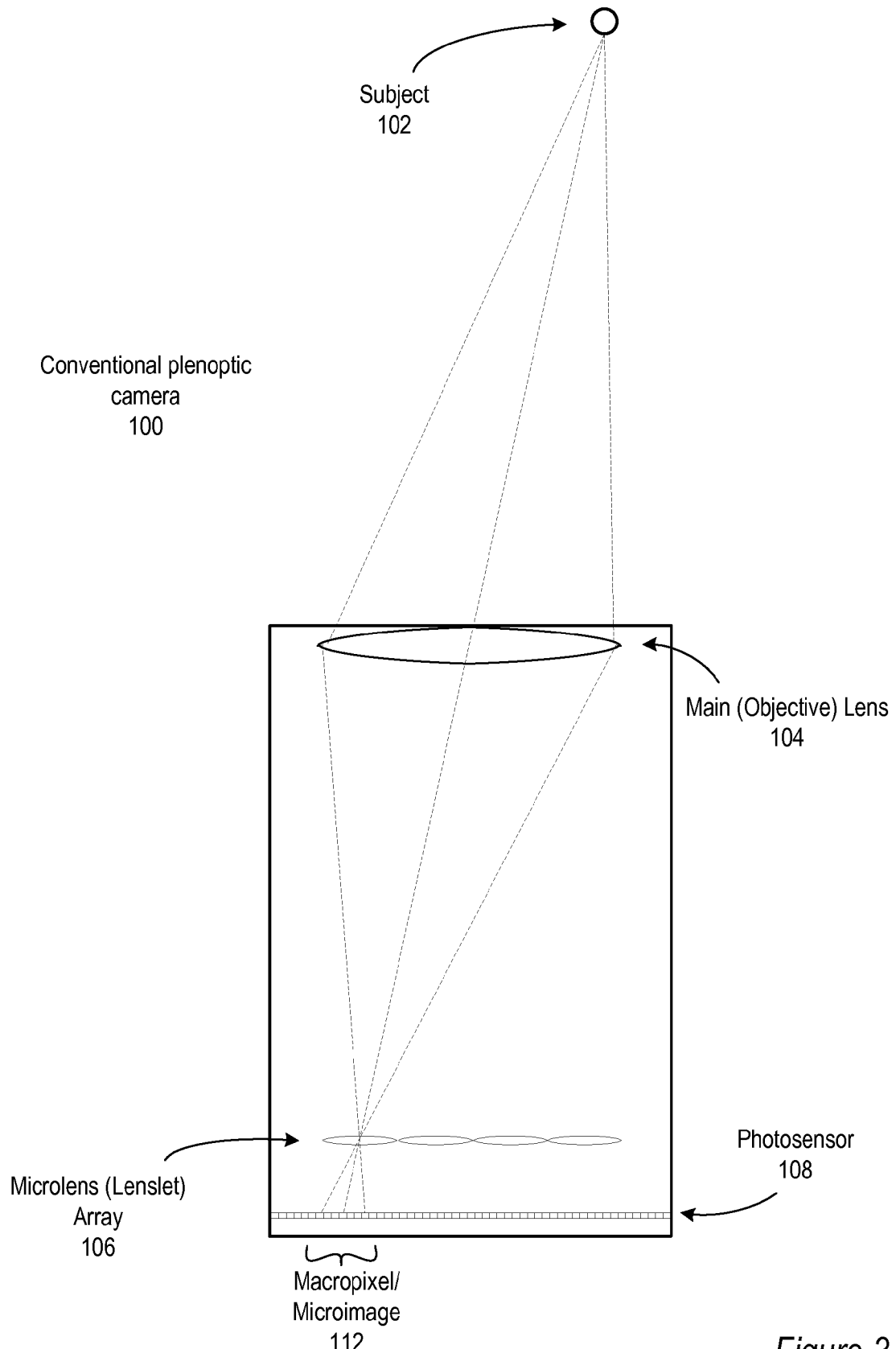
FIG. 3 illustrates an exemplary prior art plenoptic camera that employs a single objective lens and a microlens or lenslet array placed a small distance from a photosensor.

By using more than one objective lens 232, more of the pixels in the region of photosensor 210 under each lenslet 222 in lenslet array 220 may be used than in a conventional plenoptic camera operating at similar F/numbers. In the exemplary computational camera 200 of FIG. 4 that uses three objective lenses 232, each region under each lenslet 222 includes three microimages 224 coming from the three objective lenses 232. While each individual microimage 224 is similar in size to the single microimage 112 of a plenoptic camera 100 as illustrated in FIG. 3 with lenses of similar F/numbers to those in exemplary computational camera 200 of FIG. 4, collectively the three microimages 224 combine to form a microimage that is greater in area (i.e., covers more pixels) than does the single microimage 112 of plenoptic camera 100. Thus, computational camera 200 achieves the objective of better utilization of the resolution of the digital camera by using more of the pixels in the photosensor 210.

Figure 6A:
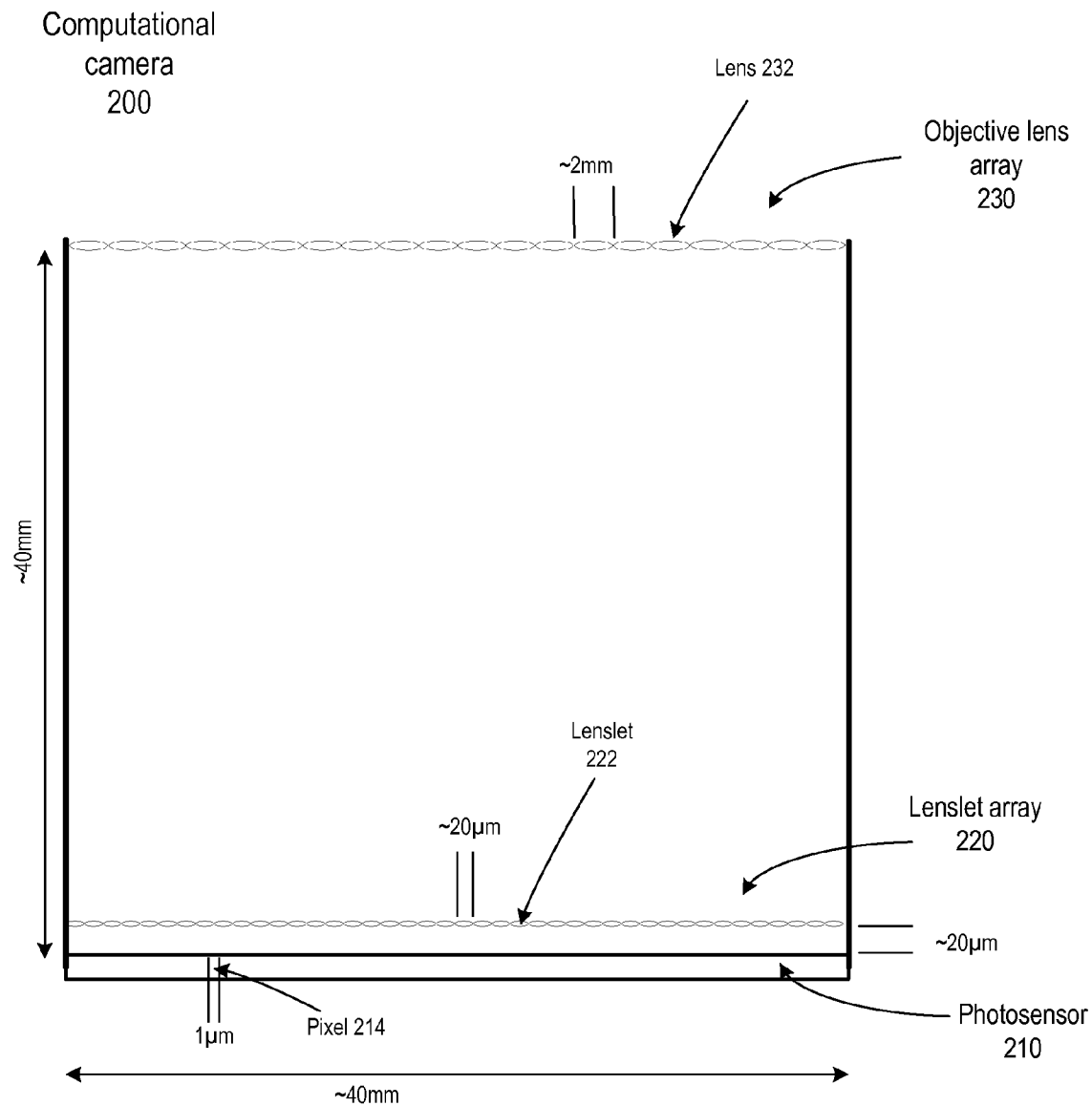
FIGS. 6A and 6B illustrate an exemplary computational camera including a 20×20 array of objective lenses and a lenslet array according to one embodiment.
Figure 6B:
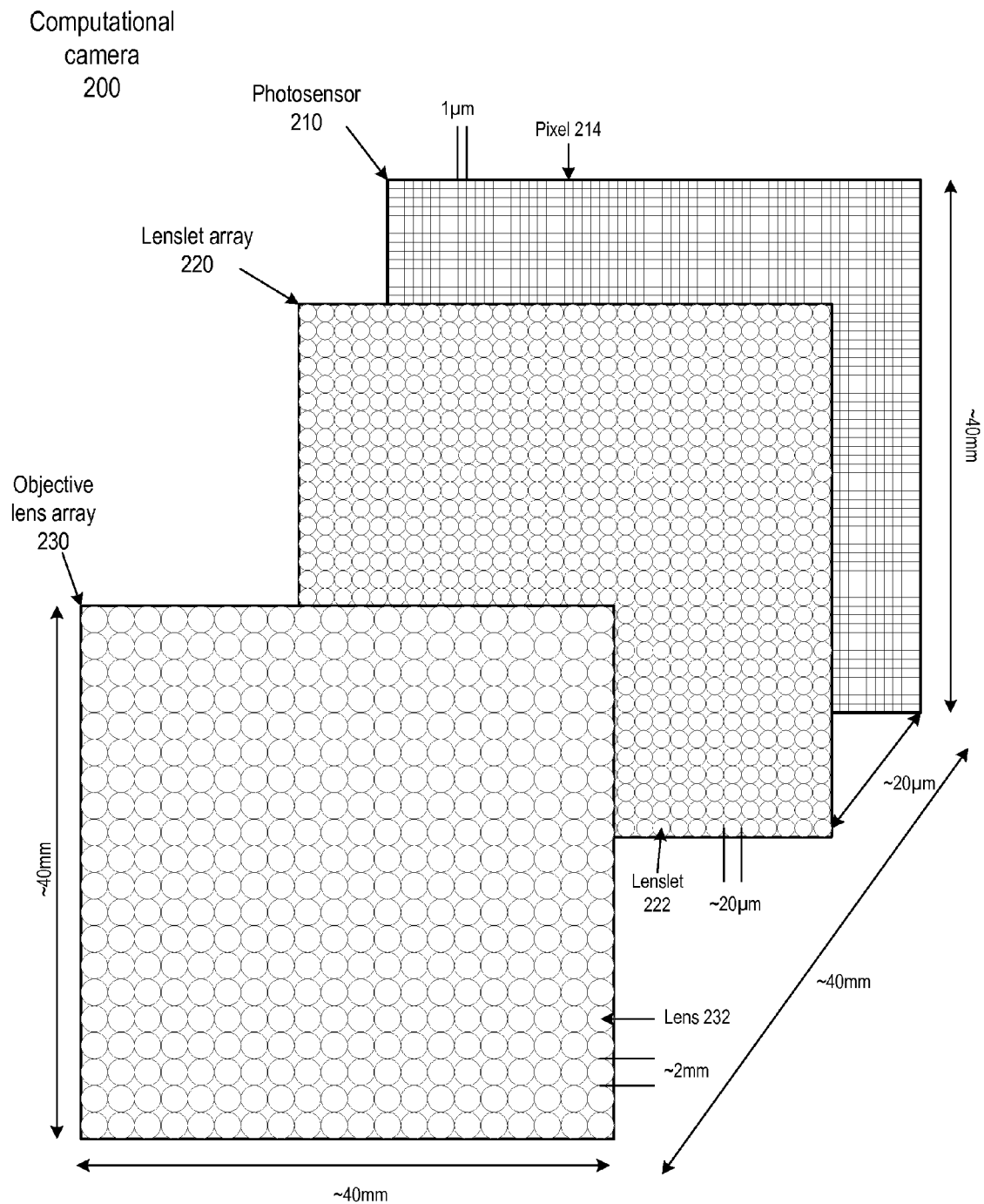

While the exemplary camera 200 of FIG. 4 employs three objective lenses 232, embodiments may include arrays of more than three objective lenses 232. For example, other embodiments may use a 2×2 array 230 of objective lenses 232 for a total of four objective lenses 232, a 3×2 array 230 of objective lenses 232 for a total of six objective lenses 232, a 3×3 array 230 of objective lenses 232 for a total of nine objective lenses 232, and so on, thus using even more, or even virtually all, of the pixels on the photosensor 210. FIGS. 8A and 8B and FIGS. 9A through 9F illustrate several exemplary embodiments of objective lens array 230 with varying numbers and configurations of objective lenses 232. FIGS. 6A and 6B illustrate an exemplary embodiment that uses a 20×20 array 230 of objective lenses 232, for a total of 400 objective lenses 232. An embodiment that uses two objective lenses 232 is also possible. While embodiments are generally described herein as using more or less square or rectangular arrays 230 of objective lenses 232, it is to be noted that embodiments that use other arrangements of objective lenses, for example circular, triangular, pentagonal, hexagonal, and octagonal arrays 230 are also possible, as well as arrays of other regular or irregular geometric shapes. For example, one embodiment may use a circular array 230 that includes, for example, seven objective lenses 232 with one lens in the middle and the other six arranged around the middle lens.

In embodiments of computational camera 200, each of N objective lenses 232 in an objective lens array 230 refracts light from a subject, where $N \geq 2$. Each of M lenslets 222 in a lenslet array 220 refracts light from each objective lens 232, where $M \geq 2$. In practice, M will also be $\geq N$, and typically $>N$. Each lenslet 222 separates the light to generate N microimages corresponding to the N objective lenses 232 on a region of the photosensor 210 under the lenslet 222. Thus, there are a total of (N*M) microimages captured on the photosensor 210. The photosensor 210 includes at least P discrete pixels, where $P=(N*M)$.

An algorithm for the alignment of microimages 224 by shifting the microimages according to the distance between objective lenses 232 is made possible by the lenslets 222 in lenslet array 220 which each separate rays coming from different objective lenses 232 according to their direction to thus create separate microimages 224 corresponding to each objective lens on photosensor 210. As mentioned above, the "ghosting" artifact due to the multiple objective lenses of the computational camera 200 may be corrected according to an algorithm implemented in hardware, software, or a combination thereof. In the exemplary computational camera 200 of FIG. 4, the algorithm may correct the ghosting effect by shifting the left and right microimages 224 to the right and left, respectively, in accordance with the distance between the objective lenses 232. For example, if the distance between the objective lenses 232 is equivalent to 38 lenslets 222 in lenslet array 220, the right microimage 224 under lenslet 222n is shifted 38 lenslets 222 to the left and replaces the right microimage 224 created under that lenslet 222, and the left microimage 224 under lenslet 222n is shifted 38 lenslets 222 to the right and replaces the left microimage 224 created under that lenslet 222. Variations of this algorithm may be used to fix or align the microimages 224 created with other configurations of objective lenses 232, for example the microimages created in an embodiment that uses a 3×3 array 230 of nine objective lenses 232.

Figure 11:
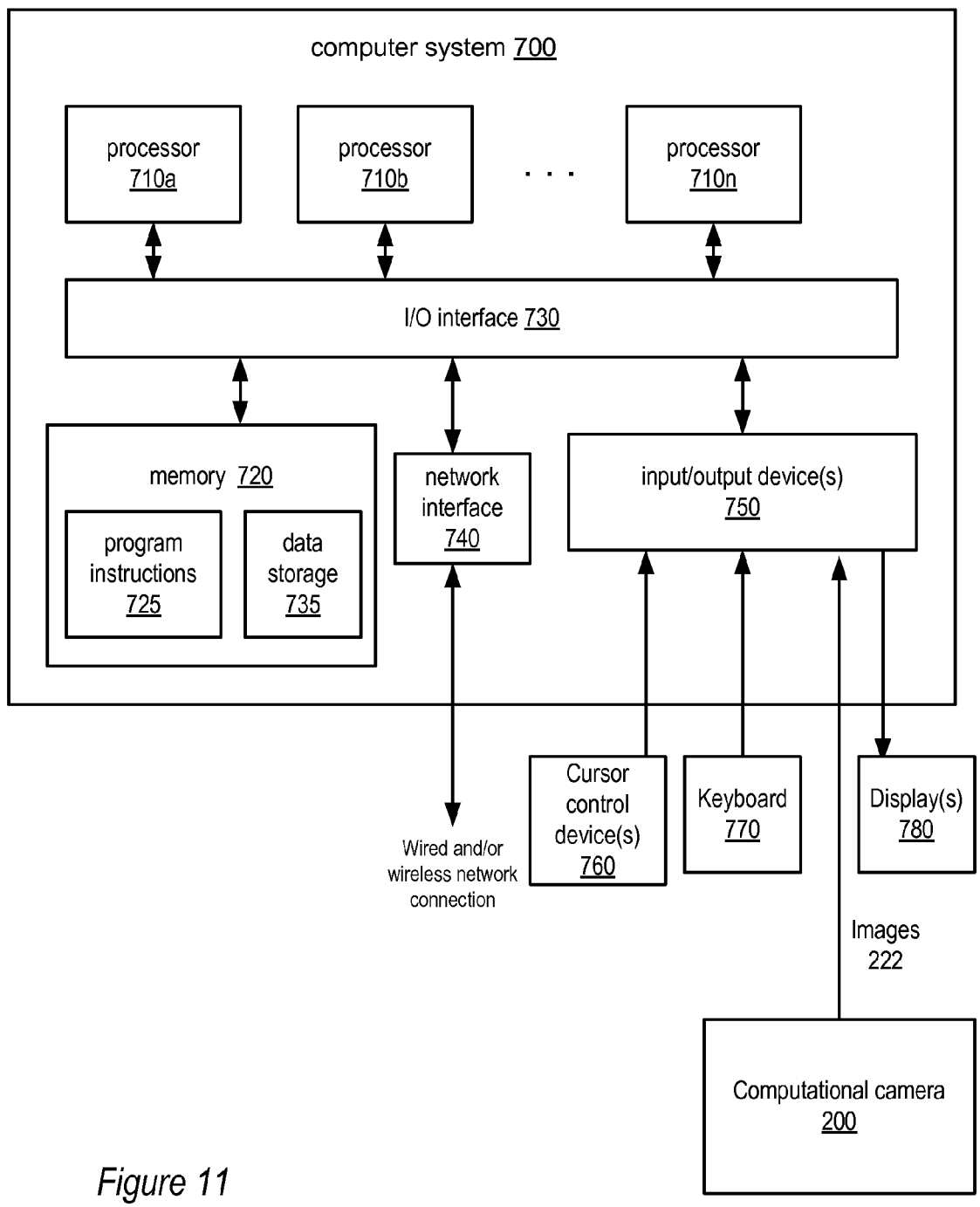
FIG. 11 illustrates an exemplary computer system that may be used in embodiments.

The above-described algorithm for aligning the microimages 224 created in computational camera 200, and/or other image processing algorithms for application to image date captured by embodiments of computational camera 200, may be implemented in hardware, software, or a combination thereof. Furthermore, the algorithm, and/or other image processing algorithms for application to image date captured by embodiments of computational camera 200, may be implemented in hardware, software, or a combination thereof in embodiments of computational camera 200, in a computer system or other device to which raw image date from computational camera 200 may be downloaded or otherwise transferred, or in both. An exemplary system in which embodiments of the algorithm, and/or other image processing algorithms for application to image date captured by embodiments of computational camera 200, for example algorithms that use the captured radiance information to refocus or otherwise manipulate the captured image, may be implemented is illustrated in FIG. 11.

Figure 5:
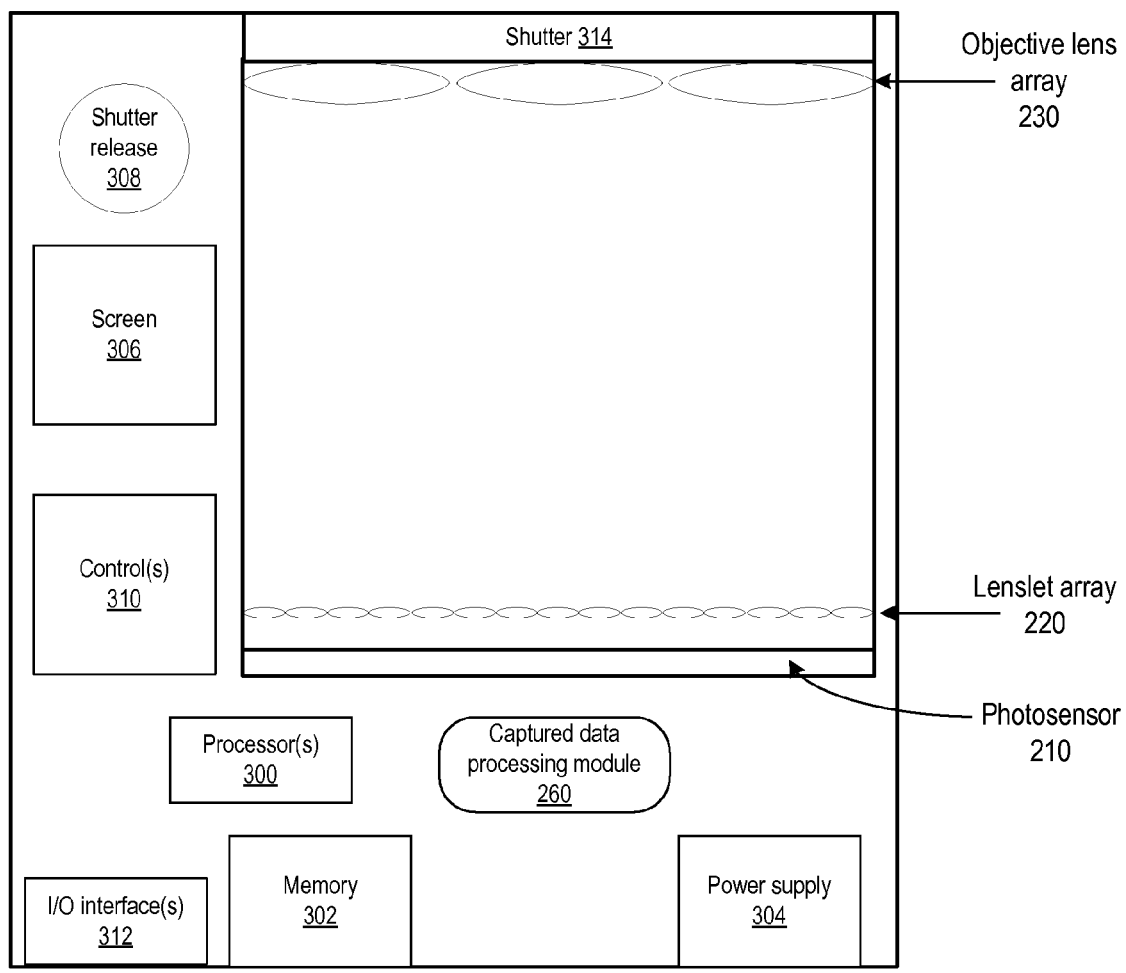
FIG. 5 illustrates an exemplary embodiment of a computational camera with various other elements integrated in the camera.

FIG. 5 illustrates an exemplary embodiment of computational camera 200 with various other elements integrated in the camera 200. In various embodiments of computational camera 200, the objective lens array 230, the lenslet array 220, and the photosensor 210 may be configured to fit within a volume that is no less than 10×10×10 millimeters and no more than 200×200×200 millimeters.

In one embodiment, an algorithm for aligning the microimages 224 created in computational camera 200, and/or other image processing algorithms for application to image date captured by embodiments of computational camera 200, may be implemented in captured data processing module 260. Captured data processing module 260 may be implemented in hardware, software, or a combination thereof. Embodiments of computational camera 200 may include other elements. For example, a computational camera 200 may include a shutter 314. Shutter 314 may be located in front of or behind objective lens array 230. As another example, a computational camera 200 may include one or more processors 300. As another example, a computational camera 200 may include a power supply or power source 304, such as one or more batteries. As another example, a computational camera 200 may include a memory storage device or system 302 for storing captured image date and/or captured final images or other information such as software. In one embodiment, the memory 302 may be a removable storage device such as a memory stick. As another example, a computational camera 200 may include a screen 306 (e.g., an LCD screen) for viewing scenes in front of the camera prior to capture and/or for viewing previously captured images. The screen 306 may also be used to display one or more menus or other information to the user. As another example, a computational camera 200 may include one or more I/O interfaces 312, such as FireWire or Universal Serial Bus (USB) interfaces, for transferring information, e.g. captured images, software updates, and so on, to and from external devices such as computer systems or even other cameras. As another example, a computational camera 200 may include one or more controls 310, for example controls for controlling optical aspects of the camera 200 such as shutter speed, one or more controls for viewing and otherwise managing and manipulating captured images stored in a memory on the camera, etc. A computational camera 200 may include a shutter release 308 that is activated to capture an image of a subject. In general, embodiments of a computational camera 200 as described herein may include, in addition to the two arrays of lenses 220 and 230 and photosensor 210, any other type of elements and features commonly found in digital cameras or other cameras including light-field and plenoptic cameras, and may also include additional elements and features.

FIGS. 6A and 6B illustrate an exemplary computational camera including a 20×20 array of objective lenses and a lenslet array according to one embodiment. The embodiment of computational camera 200 illustrated in FIGS. 6A and 6B uses a 20×20 objective lens array 230 that includes a total of 400 objective lenses 232 arranged, for example, in a square or rectangle. In one embodiment, computational camera 200 of FIGS. 6A and 6B may be implemented as a camera that is more or less cubical, with dimensions of, or approximately of, 40×40×40 millimeters (mm). Other embodiments may use other dimensions and/or configurations than the exemplary cubic or approximately cubic configuration. The computational camera 200 may include a shutter similar to shutters used in conventional cameras, which may be located in front of or behind objective lens array 230, that may be used to capture timed exposures on photosensor 210.

In this embodiment of computational camera 200, light is refracted through the 20×20 array 230 of objective lenses 232 (for a total of 400 objective lenses 232). Each objective lens 232 has a diameter of ~2 mm and a focal length of ~40 mm, which corresponds to F/20. At that F/number, lenses 232 may be easily manufactured diffraction limited. Essentially, any lens is diffraction limited at high F/numbers. Furthermore, the diffraction blur circle in the case of a circular lens has a diameter $(1.22*\lambda*F)$, where $\lambda$ is the wavelength of light, and F is the F/number. In this exemplary case, $\lambda$=500 nanometers (nm), and F=20, resulting in a blur radius of 12 microns (12 μm).

In this exemplary embodiment, the lenslets 212 in lenslet array 210 are of the diameter 20 microns (20 μm). Thus, the lenslet array 210 includes 2000×2000 lenslets 212, or four million lenslets. As a result, the final image will have a resolution of 20 microns (20 μm), or 50 lines per mm. This resolution is better than that of conventional camera lenses at low F/number.

In this exemplary embodiment, the lenslets 212 in lenslet array 210 have a focal length of 20 microns (20 μm). Thus, the lenslets 212 have an F/number of F/1. At this small size, essentially any lenslets is diffraction limited. Using the above formula again $(1.22*\lambda*F)$ yields a diffraction spot of 0.6 microns.

In this exemplary embodiment, the pixel 212 size of photosensor 210 is assumed to be 1 micron (1 μm), which is achievable by the industry: With a photosensor 210 of dimensions 40×40 mm, the raw image would be 40,000×40,000=1.6 gigapixels. Each macropixel/microimage is 20×20=400 pixels 212, with one pixel 212 corresponding to each objective lens 232. An algorithm, similar to the one described above, that shifts the pixels according to the distances between the objective lenses 232 may be used to correct for the ghosting artifact. Note that, with this many objective lenses 232, ghosting would make the raw image appear like a blur.

The objective lens array 230 that replaces the single main camera (objective) lens, for example the main (objective) lens in a conventional SLR camera, is much lighter, and may be as thin as, for example, 1 mm, while the image is of equal or even better quality. Furthermore, the manufacturing cost of the objective lens array 230 may be less than that of conventional high-quality single-lens-type objective lenses. High performance conventional camera objective lenses that may cost several thousand dollars have reached their optimal solution and are not likely to become any less expensive. Thus, embodiments of the computational camera 200 as described herein may be less expensive to produce than conventional single objective lens cameras while producing images of equal or better quality, and in addition may provide very fast camera speeds (i.e., with low F/numbers, F/1 or even lower) at much lower cost and size/weight than is possible with conventional single-lens solutions. Furthermore, embodiments of the computational camera 200 described herein are true light-field cameras that capture the light-field, recording not only image intensity, but also the distribution of intensity in different directions at each point.

Figure 7A:
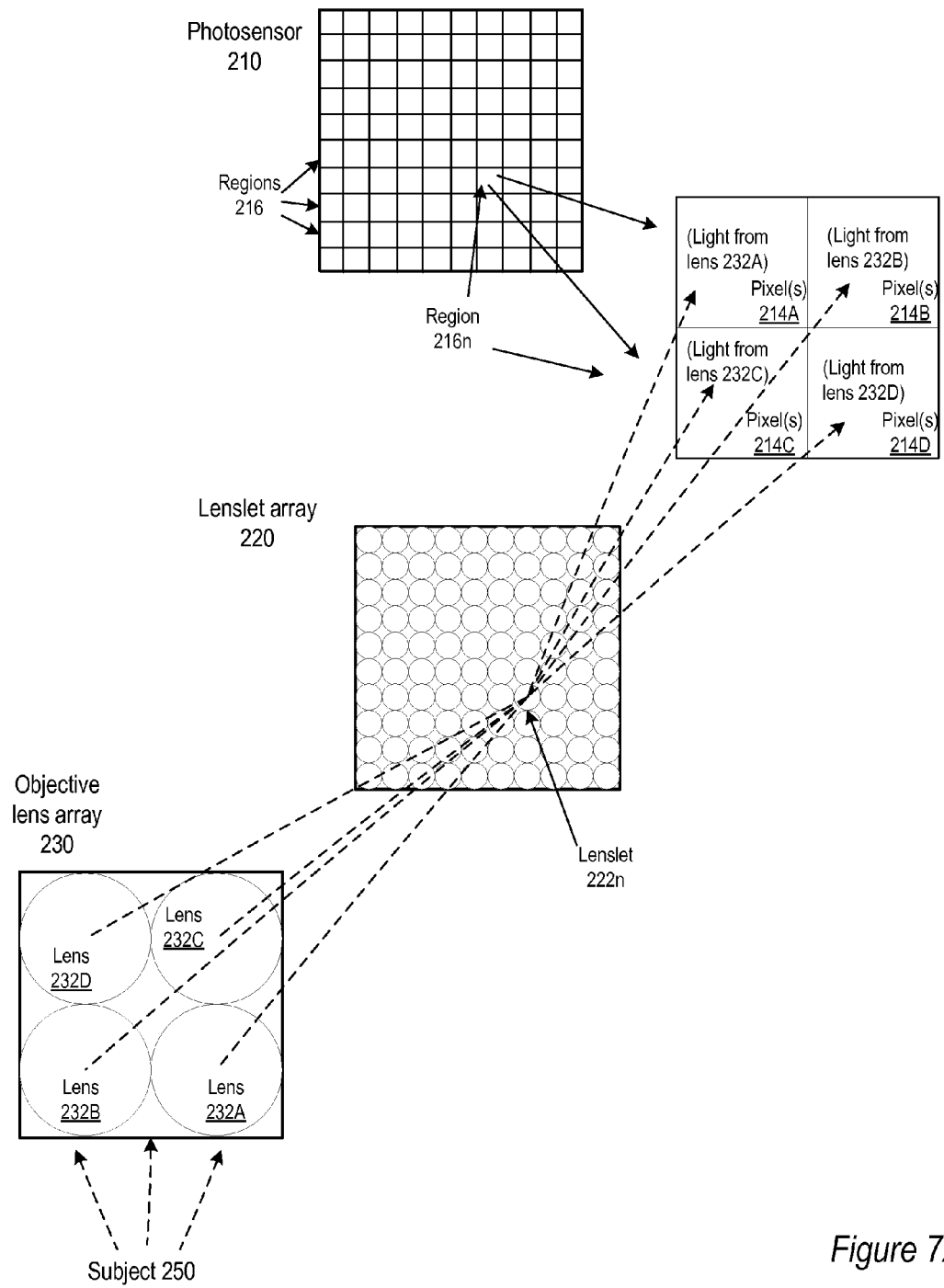
FIGS. 7A and 7B illustrate the capturing and processing of a digital image exemplary computational camera according to one embodiment.
Figure 7B:
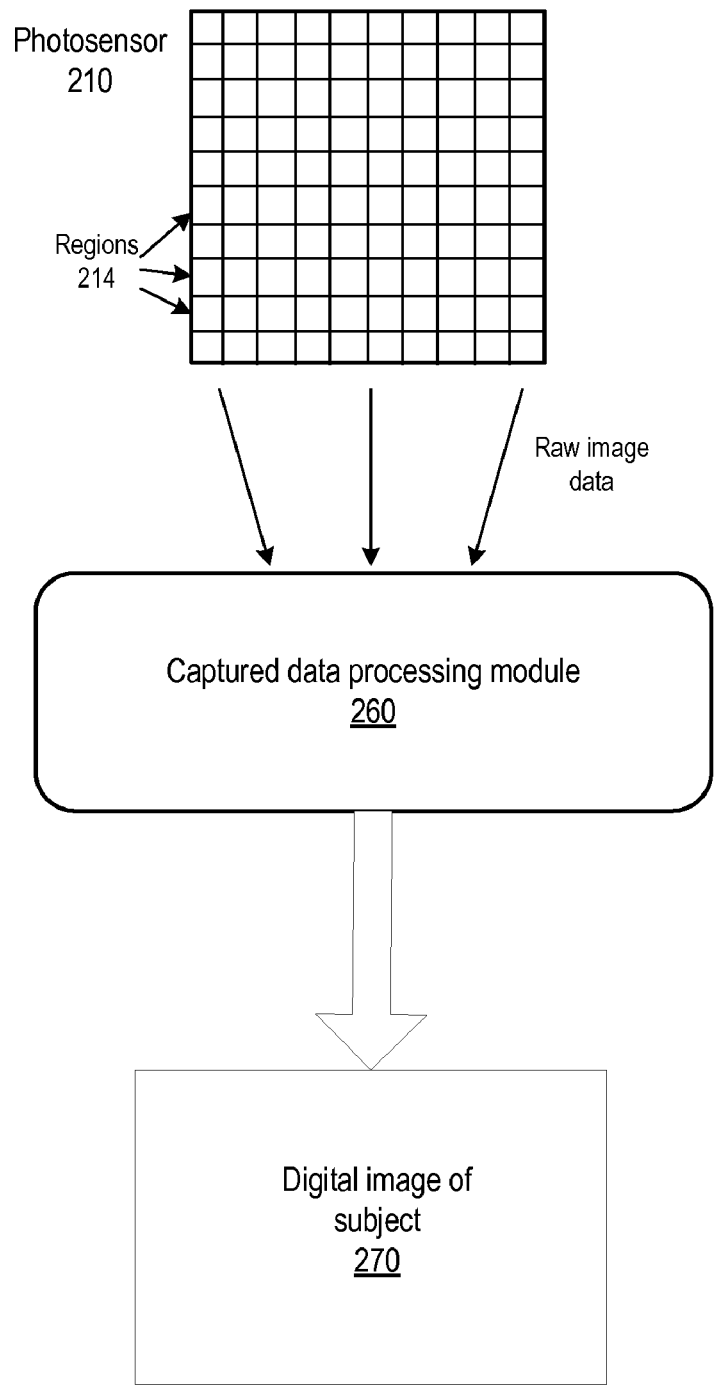

FIGS. 7A and 7B illustrate the capturing and processing of a digital image exemplary computational camera including a 2×2 array of objective lenses and a lenslet array according to one embodiment. The configuration of the embodiment of computational camera 200 illustrated in FIGS. 7A and 7B is relatively simple to aid in illustrating and describing the capturing and processing of a digital image using camera 200. Camera 200 in this example uses a 2×2 objective lens array 230 that provides a total of four objective lenses 232 that may be arranged, for example, in a square or rectangle. The exemplary lenslet array 220 in FIG. 7A includes 10×10, or 100, lenslets 222. Thus, in this example, the distance between the objective lenses 232 would be five lenslets.

In capturing an image of subject 250, light from subject 250 is collected by each objective lens 232. Light from each objective lens 232 is collected by each lenslet 222 in lenslet array 220. The lenslets 222 in lenslet array 220 each separate rays coming from the objective lenses 232 according to their direction to thus create separate microimages corresponding to each objective lens 232 on photosensor 210. In FIG. 7A, a region 216n of photosensor 210 which corresponds to lenslet 222n is expanded to show that light from the four objective lenses 232 is separated into four microimages on the region 216n. Thus, each objective lens 232 corresponds to one subregion of region 216n. Each subregion may include one or more pixels. Thus, region 216n includes at least four pixels.

In FIG. 7B, the raw image data captured by photosensor 210 may be processed by captured data processing module 260 to generate a digital image 270 of subject 250. This processing may include, but is not limited to, shifting at least some of the data captured at the subregions of regions 216 in accordance with the geometry of, e.g. the distance between, the objective lenses 232 to correct for "ghosting," as previously described. In this example, the distance between the objective lenses 232 is five lenslets; therefore, the captured image data for a subregion may be shifted five regions to the right or left, or five regions up or down. Likewise, image data for a subregion of a region 216 may be replaced by data shifted from another subregion of a different region. In addition, the algorithm may match and combine image data captured on different pixels on different regions under different lenslets 220.

Figure 8A:
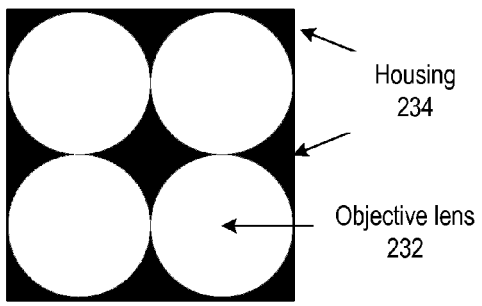
FIGS. 8A and 8B illustrate exemplary objective lens arrays 230.
Figure 8B:
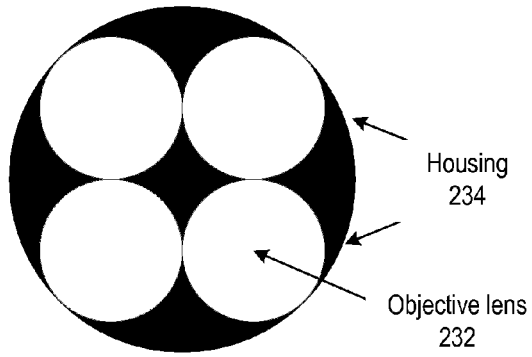

FIGS. 8A and 8B illustrate exemplary objective lens arrays 230. In FIG. 8A, four objective lenses 232 are shown mounted in a square housing 234. In FIG. 8B, four objective lenses 232 are shown mounted in a circular housing 234. Note that housing 234 may be opaque to light so that light from a subject only reaches the lenslet array 220 through objective lenses 232. Housing 234 may be made of a metal, alloy, plastic, composite material, or in general of any suitable substance or combination of substances. Housing 234 may be integrated with a computational camera 200 or may be a removable and replaceable/interchangeable component or module. Further, lenses 232 may be integrated with housing 234 or may be removable and replaceable. Housing 234, if a removable and replaceable/interchangeable component or module, may include one or more mechanisms for mounting the objective lens array 232 to a compatible camera housing. For example, housing 234 may be threaded, and/or may have one or more holes, screws, bolts, or other mechanism or mechanisms for mounting the objective lens array 232 to a compatible camera housing. In one embodiment, objective lens array 230 may have an integrated shutter. In other embodiments, the shutter may be a separate component or may be integrated with the camera housing.

Figure 9A:
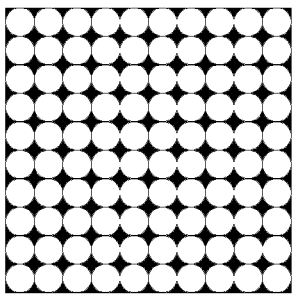
FIGS. 9A-9F illustrate various exemplary configurations for objective lens array 230.
Figure 9B:
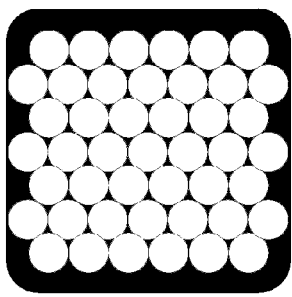
Figure 9C:
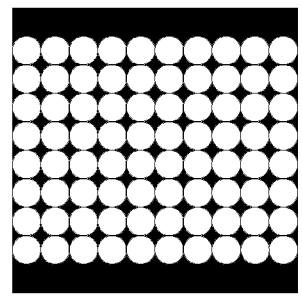
Figure 9D:
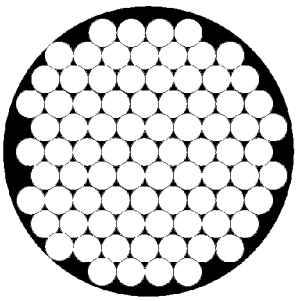
Figure 9E:
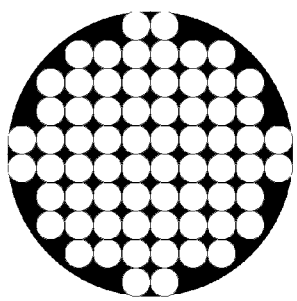
Figure 9F:
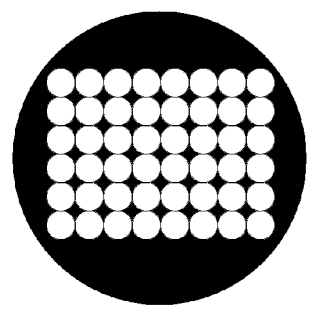

FIGS. 9A-9F illustrate various exemplary configurations for objective lens array 230. FIG. 9A illustrates a square objective lens array 230 housing that holds a 10×10 array of objective lenses 232. FIG. 9B illustrates an objective lens array 232 housing that is configured as a square with rounded corners. The array of lenses 232 consists of 45 lenses that are "packed" into a roughly rectangular geometry in the housing 234 to minimize space between the lenses 232, with four rows of six lenses and three rows of seven lenses. FIG. 9C illustrates a square objective lens array 230 housing with an 8×10 rectangular array of objective lenses 232. FIGS. 9D-9F illustrate circular objective lens array 230 housings with various configurations of lens arrays mounted in the housings 234.

As is illustrated in FIGS. 8A and 8B and FIGS. 9A-9F, in various embodiments of the computational camera 200, the objective lenses 232 may be arranged in the objective lens array 230 in different shapes. The shapes may generally be, but are not necessarily, regular geometric shapes. The regular geometric shape in at least some embodiments may be a polygon. In various embodiments, the number of objective lenses 232 may be less than or equal to 10,000, although embodiments that use more than 10,000 objective lenses 232 are possible.

The objective lens arrays 230 illustrated in FIGS. 8A-8B, and 9A-9F are exemplary, and are not intended to be limiting. Objective lens arrays 230 of various dimensions and configurations are possible and contemplated. Furthermore, various dimensions and configurations of lenslet arrays 220 are possible and contemplated. Note that at least part of the above illustrations and discussions of exemplary objective lens arrays 230 in regard to FIGS. 8A-8B and 9A-9F may be applied to the configuration of lenslet arrays 220, although lenslet arrays 220 may tend to have smaller and more numerous lenslets 222 than there are lenses 232 in objective lens arrays 230 used with the lenslet arrays 220.

In various embodiments, lenslet array 220 may be integrated with the computational camera 200, may be a removable and replaceable/interchangeable component or module, or may be integrated with the photosensor 210. In embodiments that include a lenslet array 220 integrated with the photosensor 210, the lenslet array/photosensor component may be integrated with the computational camera 200 or may be a removable and replaceable/interchangeable module.

In various embodiments of computational camera 200, the objective lens array 230, the lenslet array 220, and the photosensor 210 may be configured to fit within a volume that is no less than 10×10×10 millimeters and no more than 200×200×200 millimeters. In various embodiments of computational camera 200, the objective lenses 232 in objective lens array 230 may have an F/number between F/10 and F/100, inclusive, and the lenslets 220 in lenslet array 220 may have an F/number between F/0.7 and F/2, inclusive.

Exemplary physical characteristics for objective lens arrays 230, lenslet arrays 220, and photosensors 210 have been described herein. Furthermore, exemplary physical and optical characteristics (e.g., focal length, F/numbers, dimensions, etc.) for both objective lenses 232 and lenslets 222, alone and in combination, have been described herein. It is to be understood that these physical and optical characteristics are exemplary, and are not intended to be limiting.

While FIGS. 6B, 7A, 8A-8B, and 9A-9F show the lenses 232 in objective lens array 230 and the lenslets 222 in lenslet array 220 as circular lenses, other shapes of lenses 232 and/or lenslets 222 than circular may be used. For example, square lenses and/or lenslets may be used in embodiments, or square lenses with rounded corners may be used. As other examples, triangular, rectangular, hexagonal, octagonal, etc. lenses may be used. Furthermore, while the lenses 232 and lenslets 222 are generally illustrated in the drawings as conventional lenses with two convex surfaces, other configurations of lenses may be used, for example lenses with one convex surface and one flat surface, or lenses with one convex surface and one concave surface.

Figure 10:
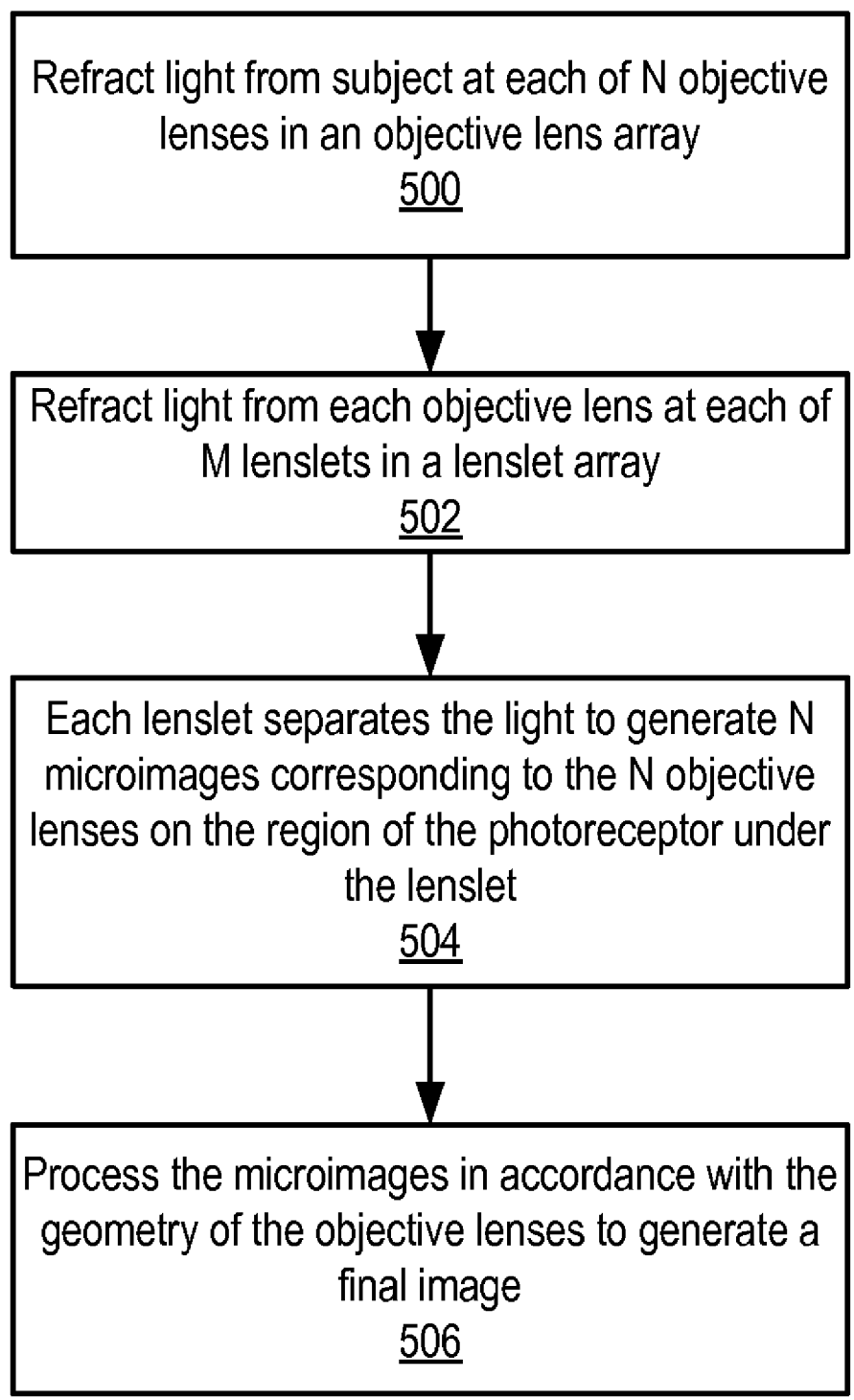
FIG. 10 is a flowchart describing the operation of a computational camera according to one embodiment.

FIG. 10 is a flowchart describing the operation of a computational camera according to one embodiment. As indicated at 500, each of N objective lenses in an objective lens array refracts light from a subject, where N≧2. As indicated at 502, each of M lenslets in a lenslet array refracts light from each objective lens, where M≧2. Note that, in practice, M will also be ≧N, typically >N. As indicated at 504, each lenslet separates the light to generate N microimages corresponding to the N objective lenses on the region of the photosensor under the lenslet. Thus, there are a total of (N*M) microimages captured on the photosensor. The photosensor includes at least P discrete pixels, where P=(N*M).

As indicated at 506, the (N*M) microimages are processed by an algorithm implemented in hardware, software, or a combination thereof in accordance with the geometry of the objective lenses to generate a final image. The algorithm for processing the raw image data may be implemented within the computational camera itself or alternatively in a separate device or computer system to which captured image information may be transferred from the computational camera, for example via an I/O interface such as FireWire or USB or via memory transfer, e.g. via a memory stick or other removable memory device. In addition to an algorithm for processing the raw image data to produce a final digital image, embodiments may also incorporate one or more algorithms implemented in hardware and/or software that perform various functions on the image data in accordance with radiance information captured by the computational camera, such as automatic refocusing of an out-of-focus image.

Exemplary System

Various embodiments of software, including but not limited to software for processing image data captured by various embodiments of a computational camera 200 as described herein, may be executed on one or more computer systems, which may interact with various other devices. One such computer system is illustrated by FIG. 11. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for software for processing image data captured by various embodiments of a computational camera 200 as described herein, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may include input from a computational camera 200 for receiving image data captured by embodiments the computational camera 200 as described herein. Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 11, memory 720 may include program instructions 725, configured to implement software, including but not limited to software for processing image data captured by various embodiments of a computational camera as described herein, and data storage 735, comprising various data accessible by program instructions 725. Data storage 735 may include data that may be used in some embodiments. In other embodiments, different software elements and data may be included.

Those skilled in the art will appreciate that computer system 700 is merely illustrative and is not intended to limit the scope of the computational camera 200 as described herein. In particular, the computer system and devices may include any combination of hardware or software that can perform the indicated functions, including but not limited to computers, network devices, internet appliances, PDAs, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
a photosensor configured to capture images projected onto the photosensor;
a multidimensional objective lens array comprising N discrete objective lenses and having at least two discrete objective lenses in each dimension, wherein each objective lens is configured to refract light from a subject located in front of an aperture of the camera; and
a multidimensional lenslet array located between the objective lens array and the photosensor, wherein the lenslet array comprises M lenslets and has at least two lenslets in each dimension, wherein each lenslet has a fixed position relative to the photosensor, wherein each lenslet in the lenslet array is configured to:
refract light from each of the N objective lenses in the multidimensional objective lens array; and
separate the light refracted from the N objective lenses and project the separated light onto N separate subregions of a region of the photosensor corresponding to the lenslet to thus project a multidimensional array of N separate images of the subject onto the respective region of the photosensor.

2. The camera as recited in claim 1, wherein the photosensor is a charge-coupled device (CCD).

3. The camera as recited in claim 1, wherein the photosensor is configured to capture the (N*M) separate images projected onto the photosensor by the plurality of lenslets.

4. The camera as recited in claim 3, wherein the camera is configured to provide the captured (N*M) separate images projected onto the photosensor by the plurality of lenslets to a module, wherein the module is configured to align and combine the (N*M) separate images to generate a final image of the subject in accordance with an algorithm for aligning and combining the (N*M) separate images according to geometry of the N objective lenses in the objective lens array.

5. The camera as recited in claim 4, wherein the module is further configured to determine radiance information for the image of the subject from the captured (N*M) separate images of the subject.

6. The camera as recited in claim 4, wherein the module is a component of the camera.

7. The camera as recited in claim 4, wherein the module is implemented in a computing device separate from the camera.

8. The camera as recited in claim 1, wherein the objective lens array, the lenslet array, and the photosensor are configured to fit within a volume that is no less than 10×10×10 millimeters and no more than 200×200×200 millimeters.

9. The camera as recited in claim 1, wherein each objective lens has an F/number of F/10 to F/100 and each lenslet has an F/number of F/0.7 to F/2.

10. The camera as recited in claim 1, wherein the objective lenses are arranged in the objective lens array in a regular geometric shape.

11. The camera as recited in claim 10, wherein the regular geometric shape is a polygon, and wherein the number of objective lenses is less than or equal to 10,000.

12. The camera as recited in claim 1, wherein the photosensor comprises at least P discrete pixels, where P=(N*M).

13. The camera as recited in claim 1, wherein pixel size of the photosensor is 1 to 5 microns.

14. The camera as recited in claim 1, wherein the camera has an F/number of F/0.7 to F/2.

15. The camera as recited in claim 1, wherein the camera further comprises a memory for storing image information captured by the camera.

16. A method for capturing a digital image of a subject, comprising:

refracting light from the subject at a multidimensional objective lens array of a camera, wherein the objective lens array comprises a plurality of objective lenses and has at least two objective lenses in each dimension, wherein each objective lens is configured to refract light from the subject located in front of an aperture of the camera;

refracting light from each of the plurality of objective lenses in the objective lens array at each of a plurality of lenslets of a multidimensional lenslet array located between the objective lens array and a photosensor configured to capture images projected onto the photosensor, wherein the multidimensional lenslet array has at least two lenslets in each dimension, and wherein each lenslet in the multidimensional lenslet array has a fixed position relative to the photosensor;

separating, at each lenslet in the lenslet array, the light refracted from the plurality of objective lenses and projecting the separated light onto a plurality of separate subregions of a region of the photosensor corresponding to the lenslet to thus project a multidimensional array of comprising a plurality of separate images of the subject onto the respective region of the photosensor; and capturing, at the photosensor, the multidimensional array of comprising the plurality of separate images projected onto the photosensor by the plurality of lenslets.

17. The method as recited in claim 16, further comprising aligning and combining the plurality of separate images to generate a final digital image of the subject in accordance with an algorithm for aligning and combining the plurality of separate images according to geometry of the plurality of objective lenses in the objective lens array.

18. The method as recited in claim 16, further comprising determining radiance information for the image of the subject from the captured plurality of separate images of the subject.

19. The method as recited in claim 16, wherein the objective lens array, the lenslet array, and the photosensor are configured to fit within a volume that is no less than 10×10×10 millimeters and no more than 200×200×200 millimeters.

20. The method as recited in claim 16, wherein each objective lens has an F/number of F/10 to F/100 and each lenslet has an F/number of F/0.7 to F/2.

21. The method as recited in claim 16, wherein the objective lenses are arranged in the objective lens array in a regular geometric shape.

22. The method as recited in claim 21, wherein the regular geometric shape is a polygon, and wherein the number of objective lenses is less than or equal to 10,000.

23. The method a recited in claim 16, wherein the photosensor comprises at least P discrete pixels, where P=(N*M).

24. The method as recited in claim 16, wherein pixel size of the photosensor is 1 to 5 microns.

25. The method as recited in claim 16, wherein the camera has an F/number of F/0.7 to F/2.

\* \* \* \* \*

UNITED STATES PATENT AND TRADEMARK OFFICE
CERTIFICATE OF CORRECTION

PATENT NO. : 7,956,924 B2
APPLICATION NO. : 11/874611
DATED : June 7, 2011
INVENTOR(S) : Todor G. Georgiev It is certified that error appears in the above-identified patent and that said Letters Patent is hereby corrected as shown below:

In The Claims:

Claim 16, col. 16, line 2, between "of" and "the plurality", please delete "comprising".

Signed and Sealed this
Twenty-third Day of August, 2011

David J. Kappos
*Director of the United States Patent and Trademark Office*